United States Patent [19]

Veser

[11] Patent Number: 5,010,639

[45] Date of Patent: Apr. 30, 1991

[54] TRANSFER TOOL AND COVER-STRIP MAGAZINE FOR DRAWING COILS INTO STATORS OF ELECTRIC MOTORS

[76] Inventor: Franz Veser, Kanalstrasse 16, 7980 Ravensburg, Fed. Rep. of Germany

[21] Appl. No.: 337,946

[22] Filed: Apr. 14, 1989

[30] Foreign Application Priority Data

Apr. 16, 1988 [DE] Fed. Rep. of Germany ....... 3812726

[51] Int. Cl.⁵ .......................................... H02K 15/06
[52] U.S. Cl. ...................................... 29/734; 29/516; 29/606; 29/736
[58] Field of Search ................. 29/732, 734, 736, 596, 29/606

[56] References Cited

U.S. PATENT DOCUMENTS 4,653,181  3/1987  Veser .................... 29/736
4,800,646  1/1989  Russell .................. 29/736

FOREIGN PATENT DOCUMENTS 1919433 11/1970 Fed. Rep. of Germany .
3209621  9/1983 Fed. Rep. of Germany .
3409684 10/1985 Fed. Rep. of Germany .
3501879  7/1986 Fed. Rep. of Germany .

Primary Examiner—Carl E. Hall
Attorney, Agent, or Firm—Spencer & Frank

[57] ABSTRACT

A transfer and introduction tooling for transporting coils from a winding machine and for drawing the coils into a variety of stators of electric motors includes a set of carrier arrangements of differing diameters and a number of interchangeable parts forming a transfer tool, an introduction tool and a cover-strip magazine. Each carrier arrangement has a central opening and a plurality of identical receiving locations disposed about its periphery. The transfer tool is formed by combining a carrier arrangement with a plurality of transfer forks where each transfer fork has two spaced fork prongs and an extension which can be releasably fastened to the receiving locations of the carrier arrangements to form a transfer tool. The extensions of the transfer forks, introduction blades and guide channels of the magazine which can be releasably inserted into receiving locations are identical, and the differing diameters and number of receiving locations of each carrier arrangement correspond to diameters of a variety of stators so that only a corresponding number of blades and forks are necessary for all possible windings of the variety of stators.

17 Claims, 4 Drawing Sheets

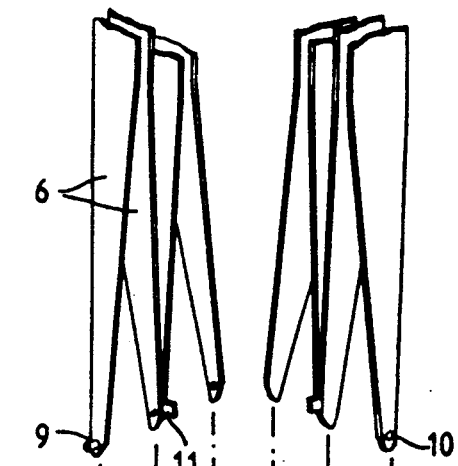
FIG. 1
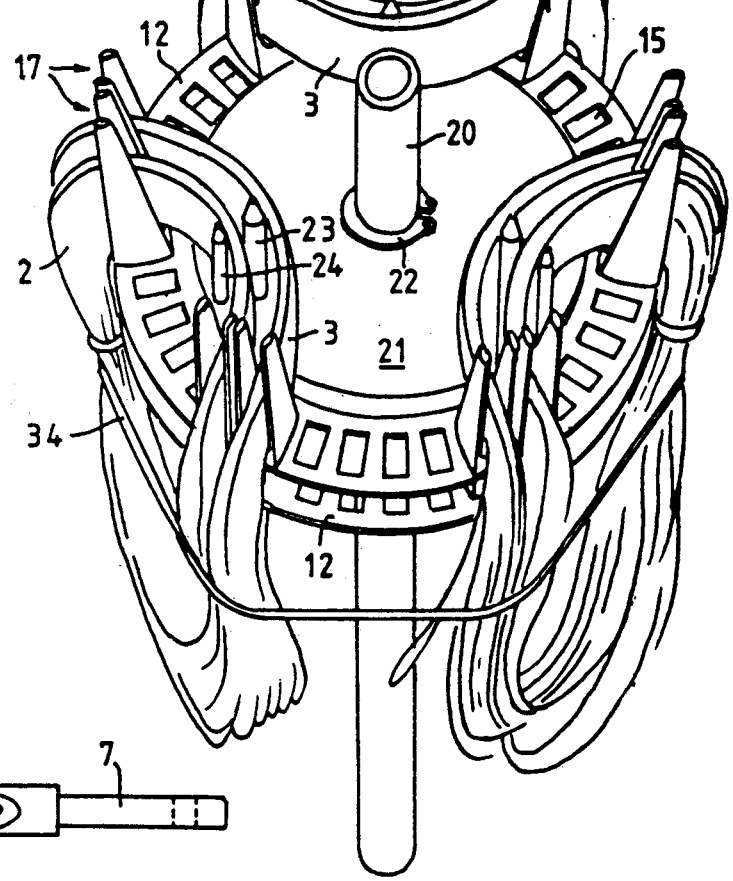
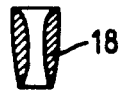
FIG. 4
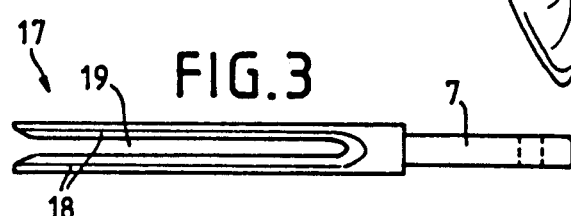
FIG. 3
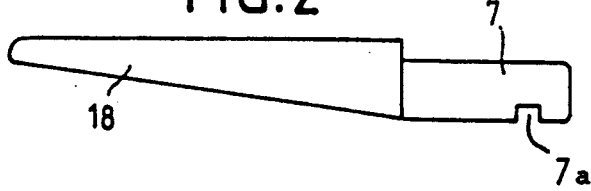
FIG. 2

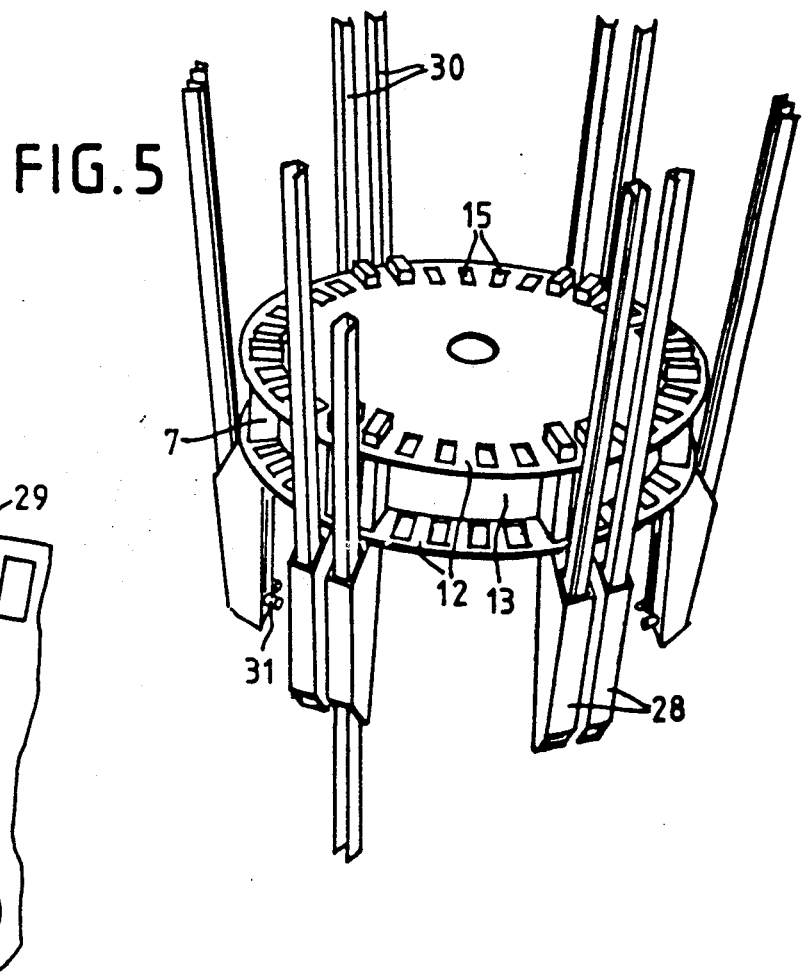
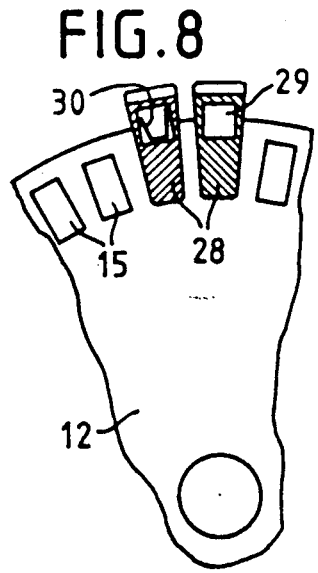
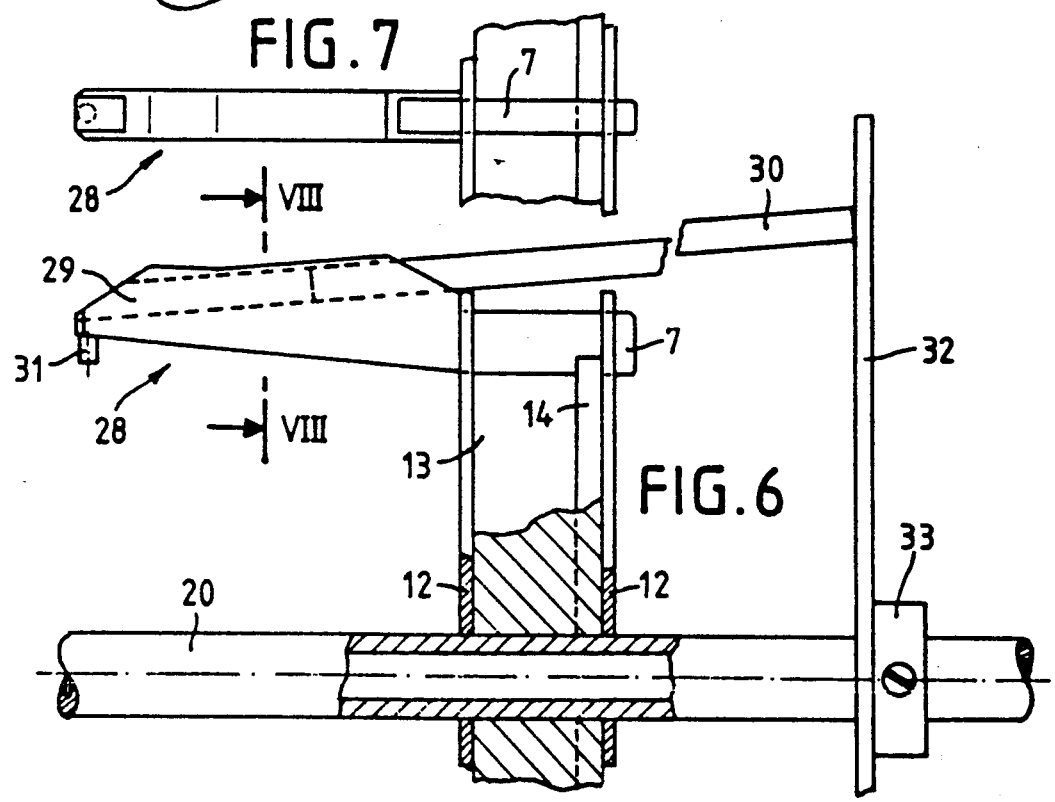

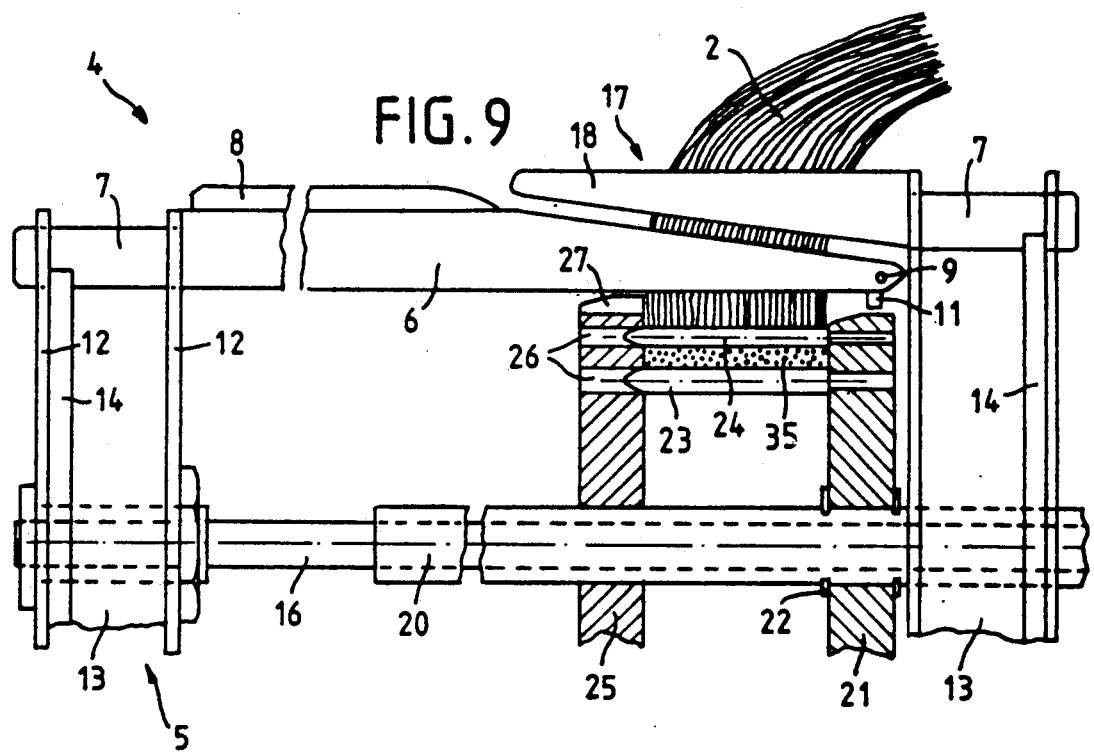
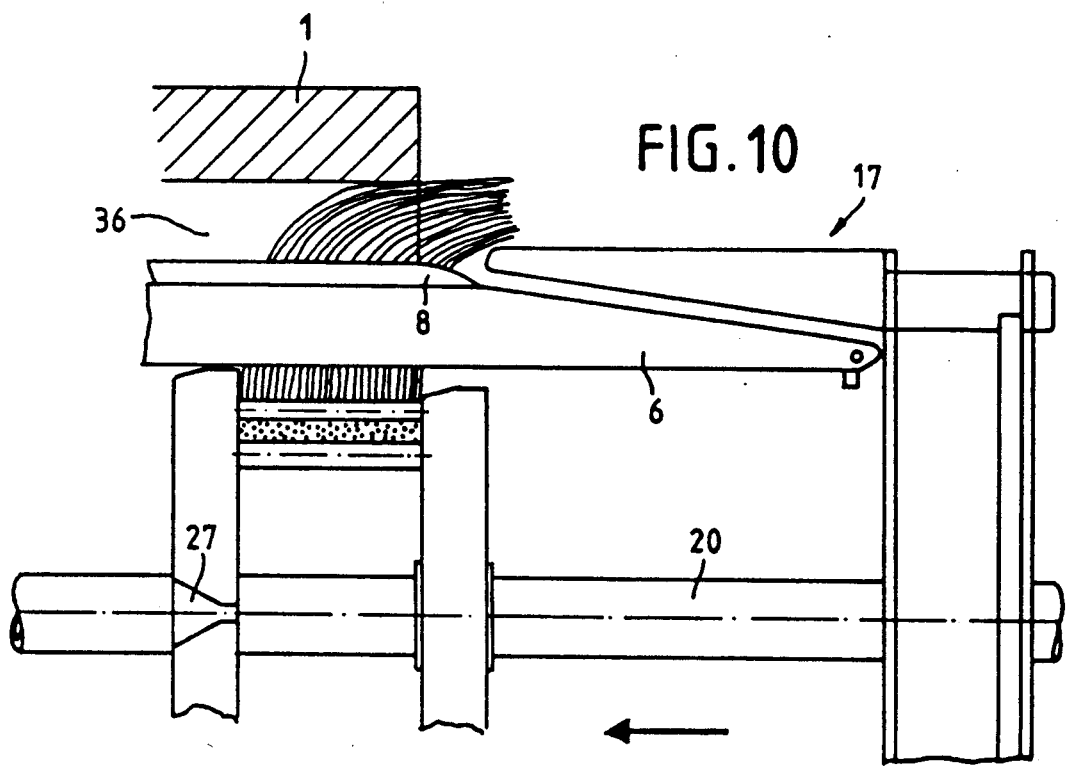

TRANSFER TOOL AND COVER-STRIP MAGAZINE FOR DRAWING COILS INTO STATORS OF ELECTRIC MOTORS

DESCRIPTION

The invention relates to a process and apparatus for drawing coils into stators of electric motors by the use of an introduction tool including introduction blades which each have two tongues spreading elastically apart from one another and which, arranged in the correct pole position, are inserted into a disc-shaped carrier arrangement having a coaxial shank, and by the use of a pushing tool which is fastened to a tubular stem shiftable on the shank and which engages on the coil ends, the stator equipped with a groove insulation being fixed by means of a clamping device.

BACKGROUND OF THE INVENTION

A process of this type is known from German Patent Specification 3,409,684. This is to be taken as a starting-point, with the proviso that the introduction blades used are made of plastic with metallic guide lamellae, as described in German Patent 3,501,879.

According to this known process, the introduction tool, together with its empty introduction blades, is first inserted a little way into a vertically arranged stator. The coils to be drawn in are then threaded in between the spread tongue tips of the introduction blades fixed in this way. The pushing tool used has radial driving arms which come up against the coil ends with their front side having a radially directed surface or bevelled slightly relative to the radial plane.

It has been shown that, during the drawing-in operation, the coils hanging freely in the introduction blades are subjected to a pressure stress which is always too high. Whilst, on the one hand, the coil sides can be drawn through the narrow gap between the guide lamellae of the tongues of the introduction blades only coil wires are arranged in a generally very flat cross-section, the driving arms of the pushing tool cause a widening or thickening of the copper cross-section of the coil sides, so that a build-up occurs. Because of the thickness of the guide lamellae, even if it is only very small, the actual clear slot width between the guide lamellae is less than the actual groove-slot width. Very high drawing-in forces have therefore been necessary hitherto, especially when a plurality of coils is drawn in simultaneously. Above all, however, damage to the enamel insulation has repeatedly occurred as a result of the high pulling and frictional forces to which the coil wires are exposed.

SUMMARY OF THE INVENTION

The object on which the invention is based is to make it easier to draw in coils, reduce the outlay in terms of time required for this and prevent damage to the coils even more effectively.

According to the invention, this object is achieved by employing a transfer tool having grouped transfer forks, and arranging wires of the coils in an extremely flat shape so that the coils sides can be easily inserted into the grouped transfer forks. The transfer tool is located behind a pushing tool in relation to the drawing-in direction and is arranged coaxially around a tubular stem of the pushing tool which can be slipped onto the shank of the introduction tool so that the transfer forks are positioned to extend radially outward over spread-open tongue end portions of corresponding introduction blades and the coil sides are received therebetween. The pushing tool then causes the coil sides to be shifted out of the transfer forks and into the introduction blades and the stator grooves. The transfer tool is then removed and, after the pushing tool has been coupled to the introduction tool, their joint movement continues.

Accordingly a transfer tool is added to tools used previously which, because of the long and narrow form of its transfer forks, unavoidably results in the flat shape of the coils, that is, to say an elongated narrow total copper cross-section of at least the coil sides parallel to the winding axis. Moreover, the transfer tool serves for transporting the coils from their place of manufacture on the winding machine to the introduction tool or to a stator. Thus, the coils to be drawn into a stator, in one thrust, are transferred jointly from the transfer tool to the introduction tool, and at least the preparatory actions, particularly the joining together of the two tools, take place or at least can take place outside the stator, thus making this assembly easier because of all-round accessability. After the introduction tool is inserted into the stator together with the transfer tool, specifically so that the guide lamellae of the tongues still project a little way from the stator, the coils are received fully into the introduction blades and already project a little way into the stator grooves. Because of the flat shape of the coils, the amount of force required for the drawing-in operation is considerably less than hitherto. As a result, rejects due to coil damage no longer occur virtually at all.

A further advantage of the invention not to be underestimated is that, in the standard rewinding of stators, the work cycle is improved and division into individual tasks becomes possible, because the winding and the filling of a plurality of transfer tools are separated as preparatory work from the actual drawing-in operation.

An advantageous development of the process according to the invention relates to the introduction of cover strips, that is to say insulating strips of U-shaped edge cross-section, into the stator grooves. Although it is already known to push in cover strips together with and at the same time as the drawing in of the coils by means of a thrust plate resting on them at the rear, nonetheless the cover strips have first had to be attached individually in series. It is proposed that all the cover strips required for a drawing-in operation be contained, ready for drawing in, in a magazine filled previously and elsewhere, which is attached to the shank of the introduction tool and by means of which the cover strips are inserted jointly with their front part between the guide lamellae of the introduction blades and the copper filling of the groove so far that they preserve this initial position.

Further aspects of the invention relate to expedient embodiments of the tools which can be used for carrying out the process according to the invention, especially of the transfer tool and the cover-strip magazine. These, like the introduction tool used, can be varied and adapted for stators with differing diameters, numbers of holes and types of windings. For this, it is proposed that these tools consist of individual parts which can be fastened by standard fastening means to carrier arrangements of designs identical to one another. The individual carrier arrangement, consisting of a circular-cylindrical disc with a continuous collar on the outer surface, a perforated disc being attached on each side, corresponds to a carrier arrangement of the known introduction tool. The disc diameter and, if appropriate, the numbers of holes are appropriately graded, so that stators with as many different dimensions as possible can be included.

Thus the introduction blades constitute the constructional elements of the introduction tool, the transfer forks are the constructional elements of the transfer tools and the guide channels are the constructional elements of the cover-strip magazines, according to the invention. The respective fastening extensions of completely identical form correspond in shape to the foot parts of the known introduction blades. Thus, the tools of the instant invention form a system of working aids which is characterized by an extremely wide range of use and low investment costs. This is shown, for example, by the fact that the carrier arrangements through the three tools interacting for the purpose of processing a stator have three different diameters, so that the carrier arrangements need be provided only once in each size.

An essential feature of the transfer forks is that the distance between the two mutually parallel fork prongs corresponds approximately to the groove-slot width of the stator. The coil sides are thereby received into the introduction blades in such a flat cross-sectional form that, in this form, they can be drawn through the groove slots easily and without damage.

Furthermore, the special design of the pushing tool makes a decisive contribution to this. Whereas the known pushing tool caused the opened-up cross-sectional form of the coil sides to be pushed together, the pushing tool proposed here is characterised in that on a push plate there are axial projections with slots formed between them and open on the side facing away from the push plate. The flat-shaped coil ends are received by these slots and preferably firmly retained. This purpose is served by a cover plate parallel to the push plate. Moreover, this cover plate can have on its edge axial guides for the tongue ends of the introduction blades, thus making it easier to assemble the transfer tool and the introduction tool.

The guide channels of the cover-strip magazines preferably have a square cross-section and are bevelled at the ends, so that the cover strips can be introduced easily and their front end is completely visible. Preferably, the guide channels are at least as long as the spread tongue portions of the introduction blades, but substantially shorter than the cover strips. An arrangement of the guide channels which converges slightly towards the stator makes it easier to introduce the cover strips.

Whilst it is known to connect the adjacent tongue ends of adjacent introduction blades to one another by pressing an elastic cowl over them, it is proposed to make a releasable connection between these tongue ends by arranging catching means on the outsides of the ends of the spread-open tongue portions, for example a peg at one tongue end and receiving orifice at the other tongue end, thus resulting in a kind of press-stud connection. The connection, at the same time with a pointed form of the connected tongue ends, makes insertion between the coils contained in the transfer tool substantially easier. Moreover, a guide nose pointing towards the stator axis can be attached to at least one tongue for the purpose of the axial guides of the combined tongue ends. This guide nose can interact with a wedge-shaped guide groove on the outer surface of the above mentioned cover plate of the pushing tool.

BRIEF DESCRIPTION OF THE DRAWINGS

An exemplary embodiment of the invention is explained below by means of the drawings. In particular, FIG. 1 shows a three-dimensional view of a transfer tool and pushing tool arrangement of the invention which is equipped with coils;

FIG. 2 shows a side view of a transfer fork of the transfer tool according to the invention;

FIG. 3 shows a top view of the transfer fork of FIG. 2 and

FIG. 4 is a cross-section of the transfer fork,

FIG. 5 shows a three-dimensional view of a cover-strip magazine according to the invention;

FIG. 6 shows a side view of a cover-strip magazine according to FIG. 5 equipped with only one guide channel;

FIG. 7 shows the top view of a guide channel;

FIG. 8 shows a cross-section along axis VIII—VIII in FIG. 6 through two guide channels;

FIG. 9 shows a side view of an introduction tool with an attached transfer tool and pushing tool, the latter in section, according to the invention FIG. 10 shows the arrangement according to FIG. 9 in another phase of the drawing-in operation;

DESCRIPTION OF THE PREFERRED EMBODIMENTS

Figure 11:
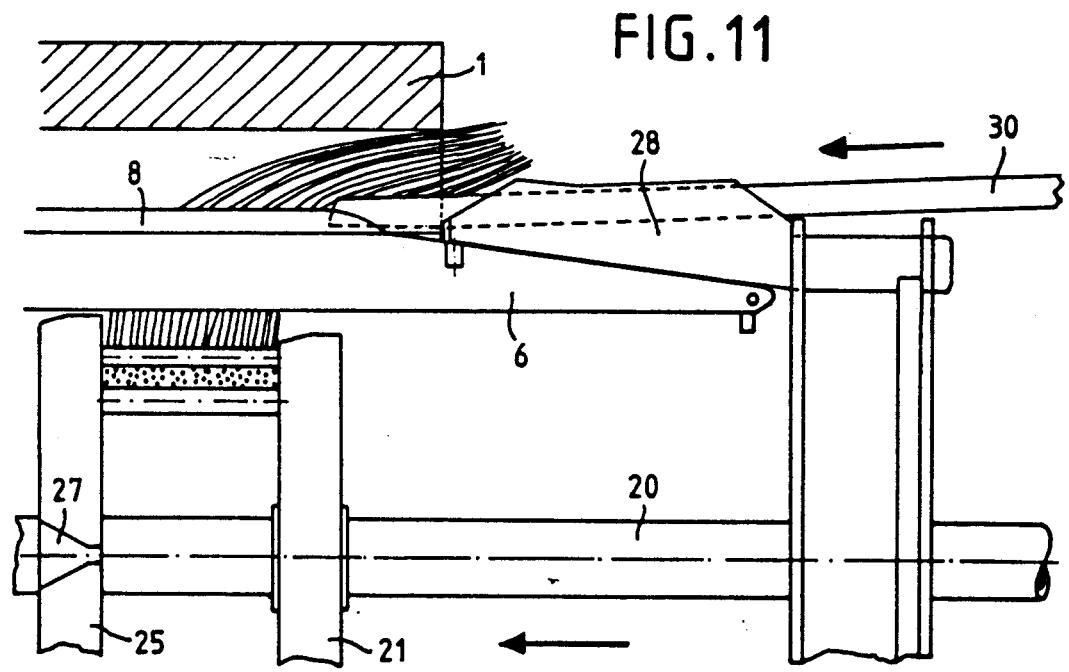
FIG. 11 shows the arrangement of FIG. 9 in a further phase, the transfer tool being replaced by a cover-strip magazine.

The devices illustrated serve for winding the stator of the six-pole three-phase motor with a two-hole winding. The stator 1 indicated in FIG. 10 has thirty six grooves and, for each phase, three pairs of concentric coils 2 and 3 (FIGS. 1 and 9) which are introduced jointly.

The introduction tool 4 known in principle consists of a carrier arrangement 5 and of a series of introduction blades, each blade comprising two parallel tongues 6 which are made of a relatively elastic plastic and which have a common formed-on foot part 7 of rectangular cross-section. A rectangular transverse groove 7a is made in the foot part. Guide lamellae 8 made of a thin spring steel are embedded in the tongues. They guide lamella extend over the parallel mid-portion of the tongues 6 and are laid with a covering effect which is rounded at the tongue tips. The front portions tapering in a wedge-shaped manner of the tongues 6 are spread open slightly (FIG. 1). A peg 9 is located laterally on the outside of one tongue tip of an introduction blade and a hole 10 on the other tongue tip, so that the tongue tips resting against one another of adjacent introduction blades can be snapped together. Furthermore, every second introduction blade has, on one tongue tip, a guide nose 11 pointing radially inwards in relation to the stator.

The carrier arrangement 5 (FIG. 9) two identical perforated discs 12 which receive between them a thicker disc 13 with a rectangular collar 14 on its outer surface. The perforated discs each have a ring of thirty six rectangular holes 15 which fit together with the foot parts 7. The foot parts are first inserted through the right-hand perforated disc and pushed over a collar 14 in an oblique position, so that the latter falls into the transverse groove 7a. The second perforated disc is then also attached, and the set is held together by means of a screw connection (not shown) and connected firmly to a coaxial shank 16. To simplify this assembly, it is recommended to stretch a rubber ring over the foot parts 7, with the result that they are held elastically until the second perforated disc is attached. The number and arrangement of the introduction blades on the ring of holes depends on the particular intended use. In the example, twelve introduction blades are arranged uniformly over the periphery in pairs. To simplify the representation of the drawing, only one introduction blade is shown in each of the FIGS. 9 to 11.

The transfer tool according to FIGS. 1 to 4 consists of the same carrier arrangement 5 and of twelve transfer forks 17 which are produced from metal by diecasting and which are equipped with a hard polished surface. These transfer forks have two parallel flat prongs 18 which taper in a wedge-shaped manner towards the tip and which are shaped convexly on the inside or rounded at the inner edges. The slot 19 between the fork prongs is of approximately the same width as the groove slots of the stator 1. The fork butt forms a foot part 7 of the same form as on the introduction blades. The twelve transfer forks 17 shown are fastened to the carrier arrangement in the same distribution and in the same way as described for the introduction blades. Since the carrier arrangement is attached shiftably to a tubular stem 20, the three discs must be held together here in the axial direction, and this can be obtained, for example, by means of two screws (not shown) which pass through unoccupied holes. For temporary fastening to the tubular stem 20, a clamping screw (not shown) passing radially through the disc 13 can be provided.

The pushing tool is explained by reference to FIGS. 1 and 9. It has a push plate 21 which is fastened coaxially to the tubular stem 20 by means of two spring rings 22. On the upper side or on the front side in relation to the drawing-in direction, altogether six pointed pins are arranged, specifically in pairs each comprising a thicker pin 23 and a thinner pin 24. These pins rest on three radii offset angularly at 120° respectively, near the edge of the disc, and extend axially. The distance between the pins corresponds in size to the distance between the fork prongs 18. Attached onto the pins is a cover plate 25 not shown in FIG. 1, the outside diameter of which corresponds to the inside diameter of the ring of introduction blades.

The cover plate 25 has six holes 26, so that it can be slipped over the pins 23 and 24 and thereby closes the slot formed between every two pins. The cover plate 25 also serves for guiding the respectively interconnected tongue tips of the respective introduction blades and for this purpose has, on its outer surface, six guide grooves 27 which open wide in the forward direction and which interact with the guide noses 11. FIGS. 9 and 10 each show one such guide groove 27 by way of example.

FIGS. 5 to 8 show a cover-strip magazine. Here too, the carrier arrangement 5 is used once again, but is equipped with twelve guide channels 28 which are produced as plastic injection mouldings. These guide channels too have the same foot parts 7. The carrier arrangement can be shifted on the tubular stem 20. The clear channel cross-section 29 is square and matched approximately to the dimensions of the cover strips 30. The channel orifices are made in the guide channels 28 in such a way that the inserted cover strips 30 are inclined slightly towards the mid-axis of the carrier arrangement. The channel orifices are bevelled. Located at the front end of each of the guide channels 28 is a guide pin 31 which points towards the axis of the carrier arrangement and interacts with the tongues of the introduction blades and which is especially important for the exact attachment of the guide channels 28 to the stator grooves. FIG. 6 also shows a thrust plate 32 which has a clamping collar 33 and can likewise be fastened to the tubular stem 20 and the diameter of which is so large that the free ends of the ring of cover strips can be encompassed.

The drawing-in of the coils of a phase by the use of the devices described, is described consecutively below. The transfer tool according to FIG. 1 is first equipped with the coils. The pushing tool is already inserted into the transfer tool in such a way that the push plate 21 rests against the perforated disc 12 located on the same side as the forks and is oriented angularly so that the pairs of pins 23, 24 stand centrally between the respective pairs of transfer forks 17. The inner coil 2 of each pair of concentric coils is threaded into the two transfer forks 17 adjacent to and at a distance from one another and between the pins 23 and 24, as is evident from FIG. 1. The coils have or thereby acquire an extremely flat "band" cross-section, since they are grasped at three places. The outer concentric coil 3 is inserted into the adjacent transfer forks 17 and wrapped round the pin 23. A further pin could also be provided, so that these coils too would be grasped centrally at the coil end. To prevent the coils from coming loose again during the transport of the transfer tools, a cover disc 25 is slipped onto the coil ends and the pins. For the same purpose, a rubber band 34 can be looped round the coil sides.

The transfer and pushing tool thus equipped is now joined together with the introduction tool by slipping the tubular stem 20 with the transfer forks 17 in front onto the shank 16. At the same time, as indicated by arrows in FIG. 1, the snapped-together tongue ends of the introduction tool penetrate between the coils 2 and 3, the guide noses 11 being led by the guide grooves 27 on the cover plate 25, this being advantageous and simplifying assembly inasmuch as the introduction blades have a certain instability and cannot be aligned with millimetre accuracy. FIG. 9 shows the assembled tools, only the coil 2 being shown for the sake of greater clarity. The guide forks 18 project radially on the outside beyond the spread-open portions of the introduction blades. The tongue tips of the introduction blades butt against the front perforated disc 12 of the transfer tool. The flat cross-section 35 of the coil 2 is enclosed between the pins 23 and 24 and the plates 21 and 25.

After the introduction tool has been inserted into the stator 1 until only a short portion of the guide lamellae 8 still projects beyond the front face of the stator (FIG. 10), the transfer of the coils now takes place. After the fastening of the transfer tool to the tubular stem 20 has been released, the latter and the entire pushing tool executes a first stroke in the direction of the arrow, specifically in relation to the stationary introduction and transfer tools. The coils carried along with them thus arrive with virtually no friction between the tongue mid-portions of the introduction blades and begin to fill the stator-groove interiors 36. In this position according to FIG. 10, the front end of the tubular stem 20 is almost at a halt against the screw connection of the carrier arrangement 5 of the introduction tool. The transfer tool can now be removed.

A second stroke, which can follow the first even without any interruption, brings the tubular stem 20 to a halt, and from then on the pushing tool with the coils, together with the introduction tool, moves in relation to the stator 1. This movement first ends in the position according to FIG. 11. The coil sides now expand with the full copper cross-section out of the stator-groove orifices and the guide lamellae 8 of the introduction blades have entered behind the front face of the stator over their entire length. This is the position for attaching the cover strips 30. Instead of a transfer tool, the filled cover-strip magazine is now slipped onto the tubular stem 20, until the guide channels 28 butt against the front face of the stator. The guide pins 31 penetrate between the spread-open tongue portions of the introduction blades and are thereby guided exactly centrally in front of the stator-groove orifices. By means of the thrust plate 32 (FIG. 6), the cover strips 30 are pushed in together as far as possible. They necessarily pass between the front ends of the guide lamellae 8 and the copper of the coil sides and are thereby clamped. The clamping is so strong that, after the removal of the thrust plate 32, the cover-strip magazine can also be removed, the cover strips 30 sliding through the guide channels 28. The thrust plate 32 is then attached once more to the free ends of the cover strips 30 and fixed to a tubular stem 20. In a final stroke, the tubular stem 20 is now moved further in the direction of the arrow, (FIG. 11) until the six coils are drawn in completely and the coil ends lie freely on the rear side of the stator. During this final stroke, the pushing tool, the introduction tool, the thrust plate 32 and the cover strips 30 constitute a single unit. At the end of the stroke, the introduction tool together with its cylindrical shank 16 is first removed behind the stator. The cover plate 25 is likewise drawn off from the tubular stem 20 in the direction of thrust. The pushing tool, together with the tubular stem 20, can then be taken out of the stator 1 counter to the direction of thrust, the pins 23 and 24 releasing the coil ends bent radially inwards.

In the example, the stator inside diameter amounts to 104 mm. The carrier arrangements of the various tools are of graded diameters, and specifically on the perforated-disc outside diameters are 103 mm for the introduction tool, 115 mm for the transfer tool and 110 mm for the cover-strip magazine.

In the example, but especially where stators of larger diameter are concerned, the tubular stem 20 is moved by means of a power drive which can be actuated by a foot switch, so that the worker has his hands free. Electrically driven lifting spindles, but also hydraulically or pneumatically actuable cylinders have proved appropriate.

In series production, the equipping of the transfer and pushing tool is a separate operation which is preferably carried out in the vicinity of the winding machine. The equipped transfer tools arrive at the drawing-in device by means of a conveyor system. Whereas the drawing-in device works with only one introduction tool, appropriately a larger number of transfer and pushing tools must be provided, so that the work rate is decoupled and buffering is possible. Likewise, the filling of the cover-strip magazines is a separate operation. The filled magazines are supplied. In the example, a stator is completed by means of three drawing-in operations, and three transfer tools and three cover-strip magazines are provided to prevent forced interruptions.

I claim:

1. A transfer tool for transporting coils from a place of manufacture to a stator having a number of longitudinal grooves, divided into divisions, through which the coils are to be drawn, said transfer tool having a winding axis and comprising:
    a carrier arrangement having means for receiving a tubular stem therethrough, said tubular stem receiving means being concentric with the winding axis, and a plurality of identically shaped receiving locations angularly disposed about its periphery;
    transfer means for receiving coils in a flat shape with at least the sides of the coils being parallel to the winding axis, and
    fastening means for releasably fastening said transfer means to receiving locations of the carrier arrangement wherein said fastened transfer means extend in the same axial direction as the tubular stem received in the receiving means, and the number and angular spacings of the receiving locations correspond to the number of grooves and groove divisions of the stator.

2. The transfer tool according to claim 1, wherein the longitudinal grooves of the stator are of a predetermined width and said transfer means comprises a plurality of transfer forks, each fork having a pair of parallel fork prongs spaced from one another, the spacing of which corresponds to the predetermined width of the stator grooves, said pair of fork prongs each having an inner surfaces facing each other which are shaped convexly and have rounded edges which receive the coils in the flat shape.

3. A cover-strip magazine for holding a number of cover strips to be introduced during a process of drawing coils into a corresponding number of grooves, divided into divisions, of a stator, said cover-strip magazine comprising:
    a carrier arrangement having a central axis, means for receiving a tubular stem therethrough, said tubular stem receiving means being coaxial with said central axis, and a plurality of identically shaped receiving locations angularly disposed about its periphery;
    a number of holding means each for receiving a cover-strip; and
    fastening means for releasably fastening said cover-strip holding means to a number of receiving locations of the carrier arrangement, wherein the fastened cover-strip holding means project from the same side of the carrier arrangement and in the same direction as the tubular stem received in the receiving means, and the number and angular spacing of the fastened cover-strip holding means correspond to the number of grooves and groove divisions of the stator.

4. The cover-strip magazine according to claim 3, wherein each cover-strip holding means comprises a guide channel having an opening with a rectangular cross-section which receives a cover-trip, said opening being inclined slightly towards the central axis of the carrier arrangement when the guide channel is fastened to a receiving location, and a fastening extension, attached to the guide channel of a cross-section identical to that of a receiving location.

5. The cover-strip magazine according to claim 4, wherein the releasable fastening means comprises a groove disposed on a side of the fastening extension and a collar which projects from the carrier arrangement a distance into the receiving locations, said groove of the fastening extension connecting with said collar to releasably fasten a guide channel to the carrier arrangement.

6. A transfer and introduction tooling for transporting coils from a winding machine and for drawing the coils into grooves of a variety of stators of electric motors, comprising:
- a set of carrier arrangements of differing diameters, each carrier arrangement having means for receiving a tubular stem and a plurality of identically shaped receiving locations disposed about its periphery;
- a plurality of transfer forks, each transfer fork having two spaced fork prongs and means for releasably fastening a fork to receiving locations of a selected one of said carrier arrangements to form a transfer tool;
- a plurality of introduction blades, each blade having two tongues spreading elastically apart from one another and means for releasably fastening a blade to the receiving locations of a selected one of said carrier arrangements to form an introduction tool; and
- a plurality of guide channels for receiving cover strips, said guide channels having means for releasably fastening a guide channel to receiving locations of a selected one of the carrier arrangements and when the guide channels are fixedly received in the receiving locations, the guide channels project in the same axial direction as the tubular stem received in the receiving means to form a cover-strip magazine, wherein said means for releasably fastening the guide channels to the receiving locations are identical to the means for releasably fastening the transfer forks and introduction blades and said transfer forks, introduction blades and guide channels are interchangeably received within said receiving locations.

7. The transfer and introduction tooling as defined in claim 6, wherein each carrier arrangement comprises:
- a pair of identical perforated discs, each having a central opening and a ring of holes on the periphery of each disc; and
- a cylindrical disc having a central axis and an outer surface parallel to the central axis with a continuous collar extending substantially perpendicular from the outer surface, said cylindrical disc being disposed between the pair of perforated discs so that the central axis is aligned with the central opening of each perforated disc and the continuous collar extends into the ring of holes; wherein the receiving locations are defined by the coinciding holes of the two perforated discs and the continuous collar of the cylindrical disc provides looking means for fastening the interchangeable transfer forks, introduction blades and guide channels to receiving locations.

8. The transfer and introduction tooling as defined in claim 6, wherein the means for releasably fastening the transfer forks, introduction blades and guide channels to the carrier arrangement are identically shaped extensions with a transverse groove in a side of the extensions which faces radially inward toward the central opening of the carrier arrangement when fastened to a receiving location.

9. The transfer and introduction tooling as defined in claim 6, wherein the number and angular spacing of the receiving locations for the transfer forks, introduction blades and guide channels correspond to the number of grooves and groove divisions of a stator.

10. A transfer and introduction tooling for drawing coils into grooves of a variety of stators, comprising:
- a set of carrier arrangements of differing diameters, each carrier arrangement having a central axis, receiving means for coaxially receiving a rod with the central axis, and a plurality of identically shaped receiving locations disposed about the periphery of a respective carrier arrangement;
- an introduction tool comprising a plurality of introduction blades, each blade having two angled tongue extensions spreading elastically apart from one another at one end and a fastening extension at the other end of the blade, and a shank fixed within the rod receiving means of a first selected one of the carrier arrangements and projecting in a first direction from the first selected carrier arrangement wherein the plurality of introduction blades are fastened to receiving locations of the first selected one of the carrier arrangements projecting in the first direction and corresponding to the correct pole position of the stator through which the coils are to be drawn;
- a pushing tool comprising a second selected one of the carrier arrangements and having a tubular stem fastened in the rod receiving means of the second selected one of the carrier arrangements, said tubular stem having a diameter greater than the shank of the introduction tool and being coaxially arranged about said shank for longitudinal movement opposite the first direction and toward the carrier arrangement; and
- a transfer tool having a winding axis coaxial with the central axis of the first selected carrier arrangement and comprising a third selected one of the carrier arrangements and transfer means for receiving the coils to be drawn in a flat shape with at least the sides of the coils being parallel to the winding axis and being releasably fastened to receiving locations of the third selected one of the carrier arrangements, the rod receiving means of the third selected one of the carrier arrangements being fixed to the tubular stem with the fastened inserting means being concentrically arranged about the periphery of the third selected carrier arrangement and projecting about the pushing tool, so that coil sides held by the transfer means are received between the spread-open tongue extensions of the corresponding introduction blades;
- wherein the longitudinal movement of the pushing tool pushes the coils sides out of the transfer means of the transfer tool and into the introduction blades and the stator grooves.

11. The transfer and introduction tooling according to claim 10, wherein the longitudinal grooves of the stator are of a predetermined width and said transfer means comprises a plurality of transfer forks, each fork having a pair of parallel fork prongs spaced from one another, the spacing of which corresponds to the predetermined width of the stator grooves, said pair of fork prongs each having inner surfaces facing each other which are shaped convexly and have rounded edges which receive the coils in the flat shape.

12. The transfer and introduction tooling according to claim 10, further comprising a cover-strip magazine for holding a number of cover strips to be introduced during a process of drawing coils into a corresponding number of grooves, divided into divisions of a stator, said cover-strip magazine comprising:

a carrier arrangement having a central axis, means for receiving a tubular stem therethrough, said tubular stem receiving means being coaxial with said central axis, and a plurality of identically shaped receiving locations angularly disposed about the periphery of the arrangement;

a number of holding means for receiving a cover-strip; and fastening means for releasably fastening said cover-strip receiving means to a number of receiving locations of the carrier arrangement, wherein the fastened cover-strip holding means project from the same side of the carrier arrangement and in the same direction as the tubular stem received in the receiving means and the number and angular spacing of the fastened cover-strip holding means correspond to the number of grooves and groove division of the stator.

13. The transfer and introduction tooling according to claim 10, wherein the pushing tool comprises a push plate firmly and coaxially connected to the tubular stem, and axial projections disposed on the push plate in a spaced relationship forming open slots therebetween in which the flat-shaped coil ends are received.

14. The transfer and introduction tool according to claim 13, wherein the pushing tool further comprises a cover plate and means for fastening the cover plate, parallel to the push plate, about the tubular stem, said cover plate resting against the ends of the axial projections of the push plate closing the slots.

15. The transfer and introduction tool according to claim 14, wherein the cover plate comprises axial guides arranged on the edge of the cover plate for receiving ends of the tongue extensions of introduction blades.

16. The transfer and introduction tooling according to claim 10, wherein each introduction blade further comprises catching means, arranged on the outsides of the ends of the spread-open tongue extensions for connecting adjacent tongue extensions of adjacent introduction blades releasably to one another.

17. The transfer and introduction tooling according to claim 16, wherein each introduction blade further comprises a guide nose pointing towards the central axis in a working position of the introduction blade and arranged on at least one tongue extension, at the end of the spread-open tongue extension.

* * * * *